(12) United States Patent
Small et al.

(10) Patent No.: US 6,494,353 B2
(45) Date of Patent: Dec. 17, 2002

(54) TUBE FEEDING APPARATUS

(75) Inventors: Derrick S. Small, Sturgis, MI (US); Eric Nielson, Sturgis, MI (US); Arthur E. Givens, LaGrange, IN (US); Sean Peterson, Sturgis, MI (US); Douglas L. Sagarsee, Constantine, MI (US)

(73) Assignee: Burr Oak Tool and Guage Company, Inc., Sturgis, MI (US)

( * ) Notice: Subject to any disclaimer, the term of this patent is extended or adjusted under 35 U.S.C. 154(b) by 0 days.

(21) Appl. No.: 09/991,086

(22) Filed: Nov. 16, 2001

(65) Prior Publication Data

US 2002/0033036 A1 Mar. 21, 2002

Related U.S. Application Data

(62) Division of application No. 09/558,404, filed on Apr. 25, 2000, now Pat. No. 6,354,126.

(51) Int. Cl.[7] .......................... B65H 20/24; B21C 47/00
(52) U.S. Cl. .......................... 226/110; 72/134; 72/162; 226/172
(58) Field of Search .............................. 226/4, 110, 172, 226/179; 72/134, 162, 183, 405.06

(56) References Cited

U.S. PATENT DOCUMENTS

| | | | | |
|---|---|---|---|---|
| 3,338,492 A | * | 8/1967 | Cornell, Jr. ................. | 226/110 |
| 3,567,095 A | * | 3/1971 | Geist et al. ................. | 226/172 |
| 5,533,658 A | * | 7/1996 | Benedict et al. ............ | 226/172 |
| 5,547,065 A | * | 8/1996 | Watanabe et al. ........... | 226/110 |
| 6,041,991 A | * | 3/2000 | Mehri et al. ................ | 226/110 |
| 6,347,664 B1 | * | 2/2002 | Perio, Jr. .................... | 226/172 |
| 6,354,126 B1 | * | 3/2002 | Small et al. ................. | 72/162 |
| 2001/0025870 A1 | * | 10/2001 | Hasegawa ................... | 226/110 |

* cited by examiner

Primary Examiner—Michael R. Mansen
(74) Attorney, Agent, or Firm—Flynn, Thiel, Boutell & Tanis, P.C.

(57) ABSTRACT

A supply of continuous thin wall tubing which is drawn by a pair of opposed conveyor belts frictionally engaging the outside surfaces of the tubing first through a tube straightening device before the tube walls become engaged with the aforesaid conveyor belts so that straightened tubing is always subjected to engagement with the surfaces on the conveyor belts. The conveyor belts effect a longitudinal driving movement of the tubing into and through a tube cutting device and thence into a tube length control for accurately positioning the tube relative to the tube cutters in the tube cutting device and before the tube is cut. Once the tube length detection circuitry in the tube length control has been satisfied by the positioning of the tubing, the tube cutters in the tube cutting device is activated to sever the tubing.

2 Claims, 8 Drawing Sheets

FIG. 9

TUBE FEEDING APPARATUS

This is a divisional of Ser. No. 09/558 404, filed Apr. 25, 2000 now U.S. Pat. No. 6,354,126.

FIELD OF THE INVENTION

This invention relates to a device for driving lengthwise continuous thin wall tubing, to a tube straightening mechanism and to a tube length control mechanism, as well as to a device for driving continuous thin wall tubing through a tube straightening device, to and through a tube cutting device, which tube cutting device is activated by a tube length control which monitors the length of tubing to be cut and activates the tube cutting device only when the precise tube length is presented thereto.

BACKGROUND OF THE INVENTION

This invention arose out of a need to supply tubing cut to specific lengths requested by customers. Over the years, demand for precise lengths in cut tubing has risen and customers have certain needs which require tubing of precise length for use in its equipment and installations. In the past, maintaining precise length in cutting a plurality of tubes to length has been difficult and certain customers have been noted for returning whole lots of cut tubing if one tube in the lot is detected as being out of compliance with the customer's request, the thought being that if one tube is not cut to the requested length there must be multiple tubes also not cut to the requested length. Further, the customer does not want to have to spend its time sorting the tubing to find those that are not of the requested length.

In addition to the necessity of accurately controlling tube length, there is the desire to make the cut tube lengths straight. Tube straightening mechanisms are known but all seemingly suffer from the serious disadvantage that much time and tubing is required to effect an accurate adjustment of the next set of tube engaging rollers to accommodate a different size tubing.

Therefore, it is an object of this invention to provide a system for repetitively cutting continuous length tubing to specific lengths and without the need for human intervention for the purpose of monitoring the cut tubing to make certain that the tubing complies with the customer's request.

It is a further object of the invention to provide a system, as aforesaid, wherein the tubing to be cut is first drawn through a tube straightening device by a conveyor belt tube driving mechanism, the straightened tube being frictionally engaged by opposing surfaces of the conveyor belt system to frictionally drive the tubing lengthwise thereof.

It is a further object of the invention to provide a tube length control for controlling activation of an intermittently driven drive motor for a tube driving mechanism during a dwell period for the drive motor to precisely orient a length of tubing to be cut relative to a tube cutting device and only when the precise location has been determined by the tube length control is the tube cutting device activated to effect a severing of the tube from the continuous length tube supply.

It is a further object of the invention to provide a tube straightening mechanism which is quickly and easily adjustable to accommodate different diameter tubing thereby substantially reducing the magnitude of the down time for the changeover to different diameter tubing.

It is a further object of the invention to provide a tube straightening mechanism, as aforesaid, wherein plural pairs of a first set of tube engaging rollers each having tube guiding grooves therein are replaceable with a second set of preadjusted rollers with different size tube guiding grooves therein and into the same support as is used for the first set of tube engaging rollers.

SUMMARY OF THE INVENTION

The objects and purposes of the invention are met by providing a supply of continuous thin wall tubing which is drawn by a pair of opposed conveyor belts frictionally engaging the outside surfaces of the tubing first through a tube straightening device before the tube walls become engaged by the aforesaid conveyor belts so that straightened tubing is always subjected to engagement with the surfaces on the conveyor belts. The conveyor belts effect a longitudinal driving movement of the continuous tubing through the tube straightening mechanism and into and through a tube cutting device and thence into a tube length control for accurately positioning the tubing relative to the tube cutting device and before the tube is cut. Once the tube length detection circuitry has been satisfied by the positioning of the tubing, the tube cutting device is activated to sever the tubing.

The objects and purposes of the invention are also met by providing a tube straightening mechanism which has interchangeable, preadjusted sets of tube working rollers for quickly facilitating a change over to different size tubing and without wastage of tubing.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Certain terminology will be used in the following description for convenience in reference only and will not be limiting. The words "up", "down", "right" and "left" will designate directions in the drawings to which reference is made. The words "forward" and "rearward" as well as "upstream" and "downstream", will refer to the direction of tube movement through the system, "forward" being the normal flow direction as indicated by the arrows in FIG. 1.

The words "in" and "out" will refer to directions toward and away from, respectively, the geometric center of the device and designated parts thereof. Such terminology will include derivatives and words of similar import.

A tube drive mechanism 10 for effecting a longitudinal movement of a continuous length of tubing T through the system S will be described first. In this particular embodiment, two tubes $T_1$ and $T_2$ are moved simultaneously through the system S by the tube driving device 10.

The tube driving device 10 includes a base frame 11 having parallel tracks 12 thereon guiding a carriage 13 through a controlled reciprocal movement. An upright stanchion 14 is provided on the carriage 13 and is maintained in an upright orientation by a plurality of supports 16 also mounted on the carriage 13. The upright stanchion 14 is secured to each of the supports 16 by fasteners not illustrated. The fasteners securing the supports 16 to the carriage 13 are illustrated at 17.

A conventional worm drive mechanism 18 is provided between the carriage 13 and a base surface 19 upon which the base frame 11 is mounted. The worm drive mechanism 18 is operated by a rotatable hand crank 21. Upon a rotating of the hand crank 21 about an axis of rotation 22 therefor, the carriage 13 will move in a controlled manner left and right (in FIG. 3) relative to the base frame 11 and the base surface 19 on which the base frame 11 is mounted. Of course, the upright stanchion 14 and the supports 16 therefor will move with the carriage 13.

Figure 1:
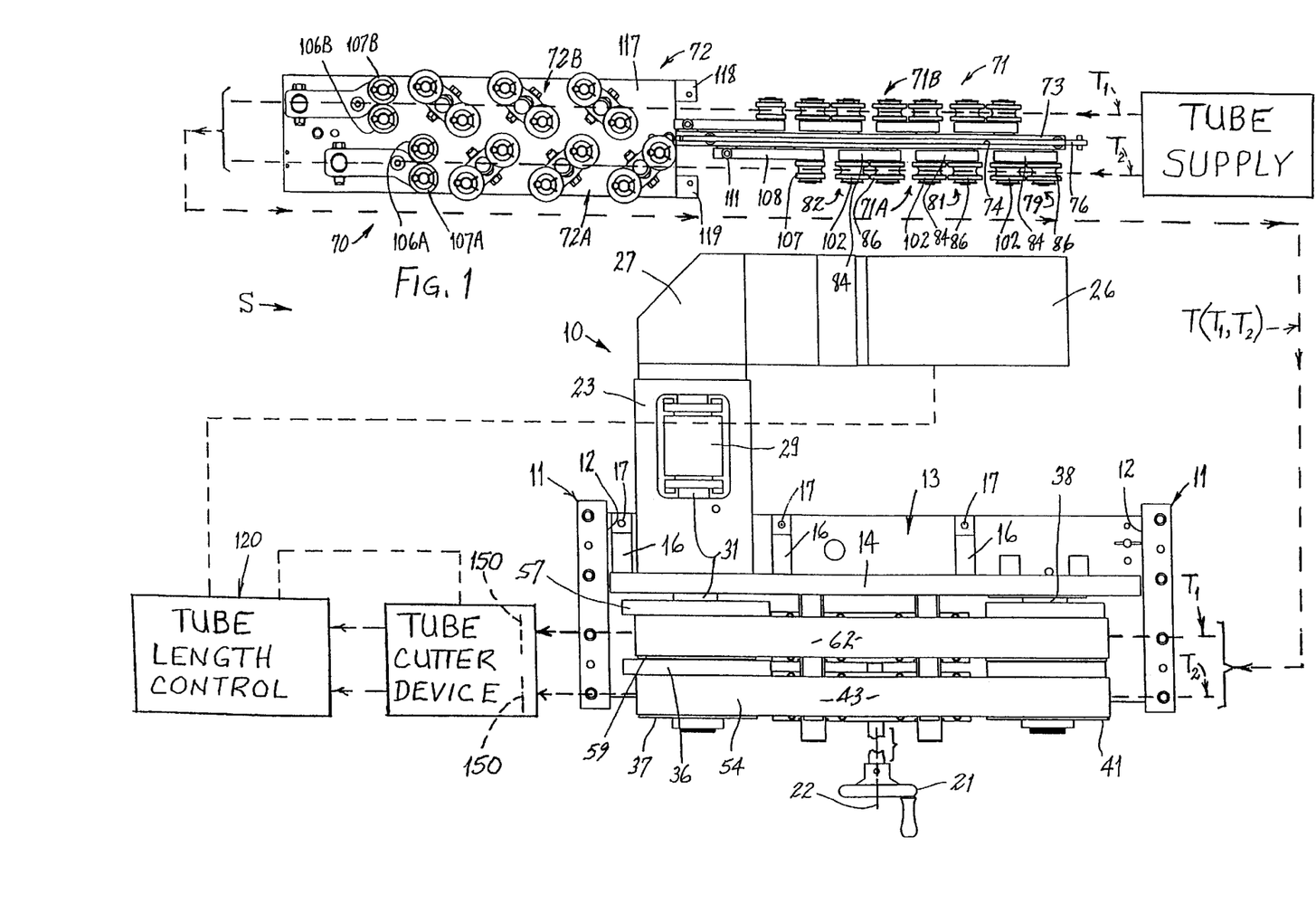
FIG. 1 is a top plan view of a tube straightener and drive mechanism for the tubing used in combination with a tube length control for facilitating a cutting of a continuous length tubing into predefined lengths.
Figure 3:
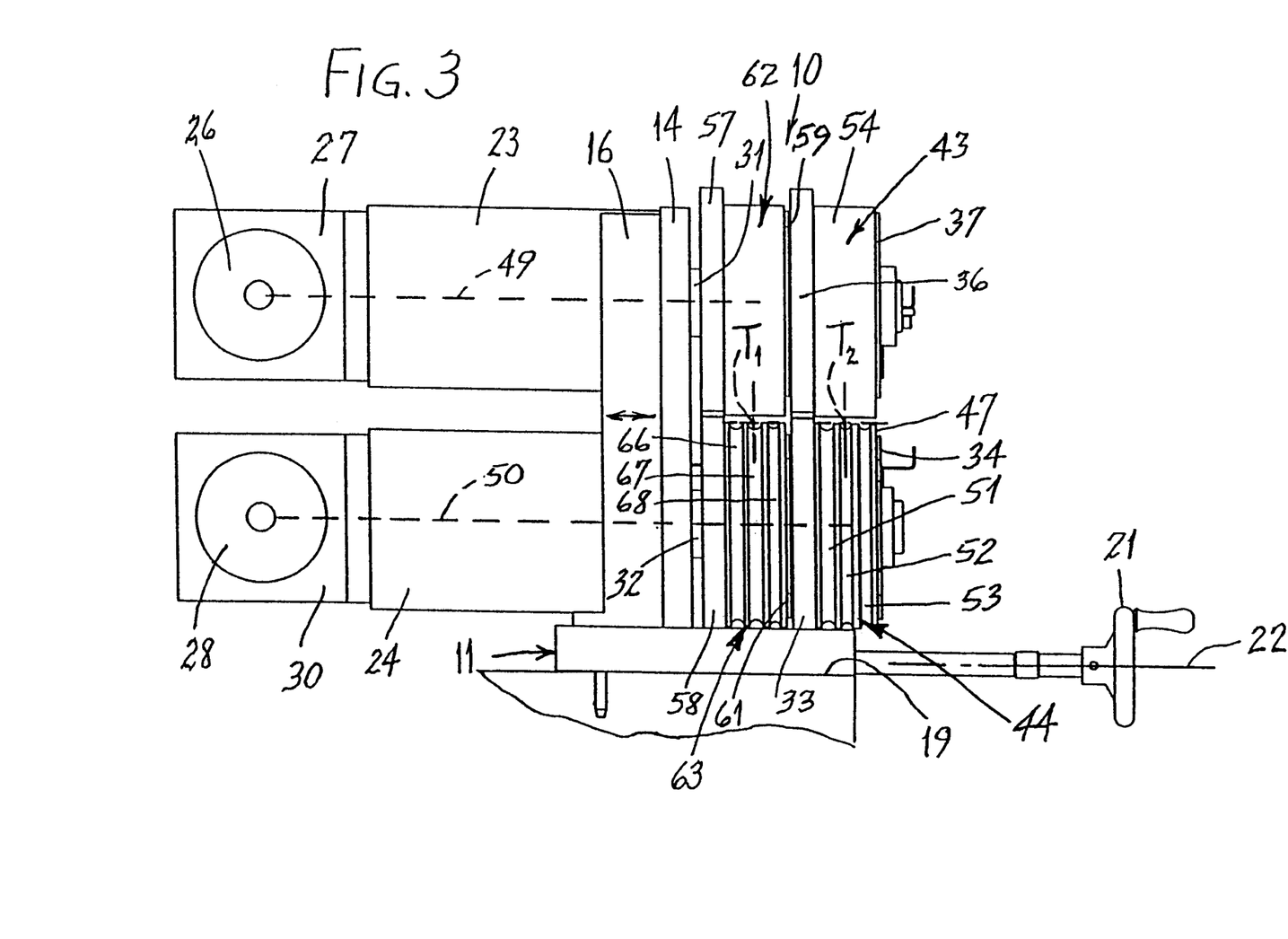
FIG. 3 is a left end view of the tube drive mechanism for the tubing shown in FIG. 2.

A pair of motor mounting brackets 23 and 24 (FIG. 3) are secured to the upright stanchion 14 and project in a cantilevered manner leftwardly away therefrom. A first motor 26 and right angle drive 27 therefor are connected to the motor mounting bracket 23 as shown in FIG. 1. A second motor 28 and its right angle drive 30 are mounted to the bracket 24 as illustrated in FIG. 3 directly beneath the motor 26, right angle drive 27 and bracket 23. The drive motors 26 and 28 are both electrical intermittently driven servomotors which are reversible and controllable with respect to a desired point of stoppage. The purpose of this feature will become more apparent below. The output shaft of the drive motor 26 is connected through a coupling 29 to a rotatable shaft 31. This connection is also schematically depicted at 49 in FIG. 3. A similar drive arrangement exists for the drive motor 28 and its coupled arrangement to a drive shaft 32 which is schematically illustrated as at 50 in FIG. 3. The bearings rotatably supporting the rotatable shafts 31 and 32 are not illustrated but can be oriented within the respective motor mounting brackets 23 and 24.

In this particular embodiment, the rotatable shaft 32 is drivingly connected to a spur gear 33 which has a toothed belt driving wheel 34 fastened thereto. A further spur gear 36 and toothed belt driving wheel 37 are freely rotatably supported on the shaft 31. The spur gears 33 and 36 are meshingly engaged with one another so that a driving of the spur gear 33 by the motor 28 will effect a simultaneous rotation of the spur gear 36 and toothed belt driving wheel 37 secured thereto.

Shafts 38 and 39 are also provided on and cantilevered from the stanchion 14, the axis of the shaft 38 being contained in the same horizontal plane as the axis of the shaft 31 whereas the axis of the shaft 39 is in the same horizontal plane as is the axis of the shaft 32. Toothed belt driving wheels 41 and 42 are freely rotatably supported on the shafts 38 and 39, respectively. An endless and toothed belt 43 is mounted on the toothed belt driving wheels 37 and 41. A further endless and toothed belt 44 is mounted on the toothed belt driving wheels 34 and 42. The reach 46 of the belt 43 and the reach 47 of the belt 44 are urged toward one another by a conventional pressure applying device 48 schematically illustrated in FIG. 2. As is illustrated in FIG. 3, the endless belt 47 has a plurality of side-by-side oriented grooves 51, 52 and 53 therein. In this particular embodiment, each of the grooves 51, 52 and 53 can be of a differing diameter to accommodate a different diameter tube working therewith and as will be explained in more detail below. The surface 54 of the belt 43 is smooth as is depicted in FIGS. 1 and 3. The surface 54 of the belt 43 opposing the surface of any selected groove 51, 52 or 53 in the belt 47 is configured to frictionally engage a tube T passing therebetween.

The drive motor 26 and right angle drive mechanism 27 effects a driving of a spur gear 57 in the same manner that the drive motor 28 effects a driving of the spur gear 33. The spur gear 57 mates with a further spur gear 58 so that the belt driving wheels 59 and 61 secured, respectively, to the spur gears 57 and 58, will be driven by the drive motor 26. Similar belt supporting wheels are freely rotatably mounted on the shafts 38 and 39 in a manner similar to the wheels 41 and 42. An endless belt 62 is mounted on the belt driving wheel 59 and the drive wheel freely rotatably supported on the shaft 38. A further endless belt 63 is mounted on the belt drive wheel 61 and a corresponding belt support wheel freely rotatably supported on the shaft 39. As is depicted in FIGS. 1 and 3, the outer surface of the belt 62 is smooth whereas the outer surface of the belt 63 has plural grooves 66, 67 and 68 therein. The size of the grooves 66, 67 and 68 can correspond, respectively, to the size of the grooves 51, 52 and 53 or be in some other relation thereto.

Referring now to FIG. 1, a tube supply is provided and, in this particular embodiment, is the source for two tubes $T_1$ and $T_2$ preferably (but not necessarily) of the same size. The tube supply is generally in coil format and the tubes $T_1$ and $T_2$ are drawn from the tube supply through a tube straightening mechanism 70 by the tube driving device 10, particularly, the tube $T_1$ being received between the opposing surfaces of the belts 62 and 63 and the tube $T_2$ being received between the opposing surfaces of the belts 43 and 44 as schematically depicted in FIG. 3.

The tube straightening mechanism is comprised of two sections 71 and 72, each section capable of working two tubes $T_1$ and $T_2$ at a time. That is, section 71 has two subsections 71A and 71B whereas section 72 has two subsections 72A and 72B. Since the construction in each of the subsections is generally the same, only the subsection 71A will be described in detail, it being understood that this description will be applicable to the remaining subsections.

Figure 4:
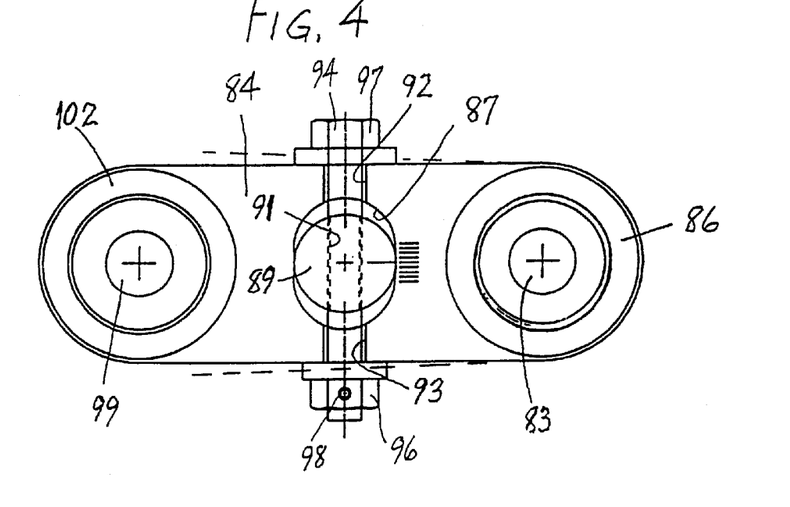
FIG. 4 is a front view of one set of tube working rollers used on the tube straightening device.
Figures 5, 6:
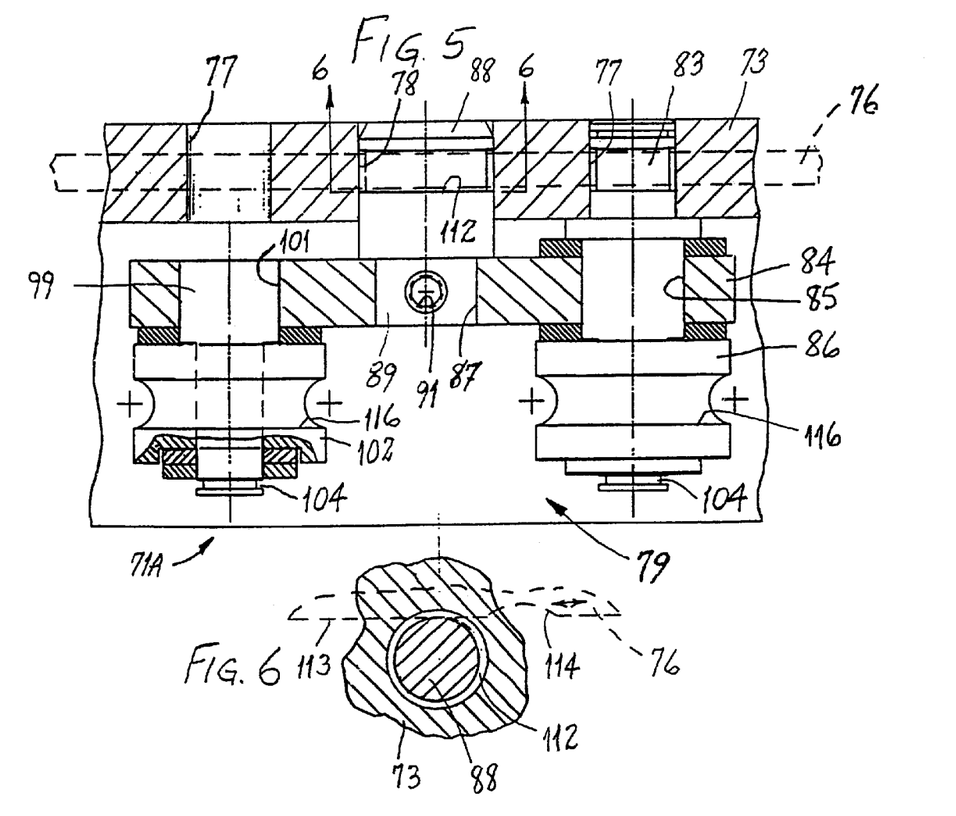
FIG. 5 is a sectional view taken along the line 5—5 of FIG. 2.
FIG. 6 is a sectional view taken along the line 6—6 of FIG. 5.

The section 71 of the tube straightening mechanism 70 includes a vertically upstanding plate 73 having along an upper edge thereof a trough 74 into which is reciprocally received a locking bar 76. The plate 73 also has a plurality of holes 77 (FIG. 5) of a first size extending therethrough and holes 78 of a second size extending therethrough. As is best illustrated in FIG. 5, each hole 78 is straddled by a pair of holes 77. In this particular embodiment, subsection 71A includes two sets of tube working rollers 79 and 81 spaced along the length of travel of the tube $T_2$ and one set of tube straightening rollers 82. Each of the tube working rollers 79 and 81 as well as the tube straightening rollers 82 are of an identical construction and, therefore, only the tube working roller set 79 will be discussed in detail with particular reference to FIGS. 4 and 5.

Figure 2:
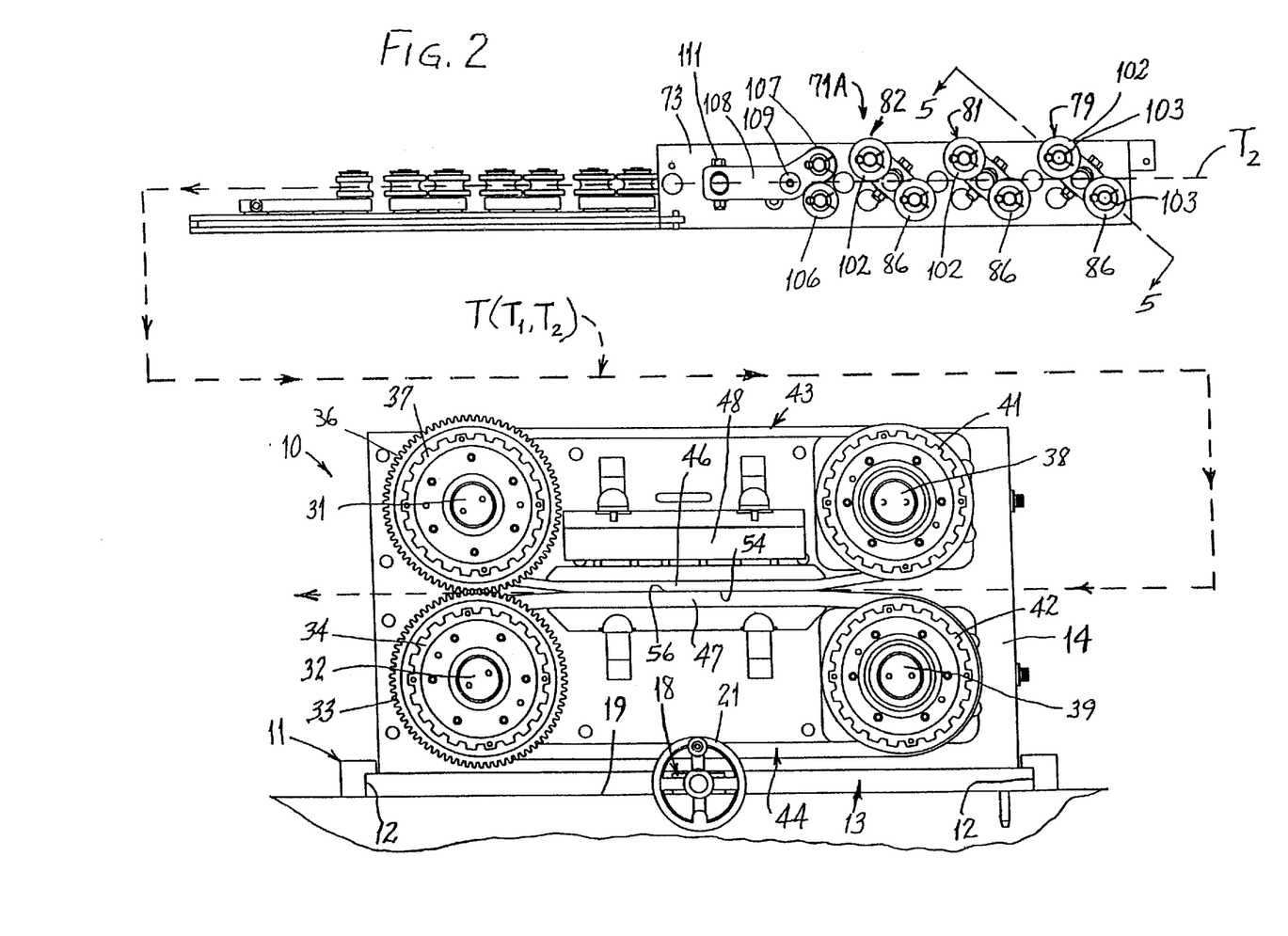
FIG. 2 is a front elevational view of the tube straightening device and the drive mechanism therefor.

The tube working roller set 79 (FIG. 5) includes a shaft 83 one end of which is removably received in the hole 77 oriented to the right of the hole 78. The shaft 83 projects in a cantilevered fashion from one side of the plate 73 through a hole 85 in a lever 84 to pivotally support the lever 84. A tube working roller 86 is rotatably supported on the shaft 83. The axis of rotation for the roller 86 coincides with the longitudinal axis of the shaft 83 as well as the pivot axis for the lever 84. Midlength of the lever 84 there is provided a hole 87, which hole is elongated in a direction transverse of the length of the lever as illustrated in FIG. 4. A shaft 88 having at one end a diameter corresponding to the diameter of the hole 78 is received in the hole 78 and, at the other end, has a stub shaft section 89 received in the hole 87 in the lever 84. An internally threaded hole 91 extends through the stub shaft section 89. The lever 84 also has a pair of holes 92 and 93 that are axially aligned with one another as well as axially aligned with the internally threaded hole 91. An externally threaded bolt 94 extends through the axially aligned holes 92 and 93 and is threadedly engaged with the threads in the hole 91. The bolt 94 has a nut 96 thereon oriented on a side of the lever 84 remote from the head 97 thereof. The nut is fixed to the bolt by a pin 98 so that the bolt 94 and nut 96 will simply rotate in the axially aligned holes 92 and 93 to effect a pivoting of the lever 84 about the axis of the shaft 83 to and between positions depicted in broken lines in FIG. 4. A stub shaft 99 is received in a hole 101 in the lever 84 on a side of the hole 87 remote from the hole 85. A tube working roller 102 is rotatably supported on a reduced diameter section of the stub shaft 99 as best illustrated in FIG. 5. The tube working rollers 86 and 102 are each maintained on their respective shafts by pins 103 (FIG. 2) received in grooves 104. Since as is illustrated in FIG. 2 the tube working rollers 86 and 102 are oriented on opposite sides of the longitudinal axis of the tube $T_2$ which is to be straightened, it can be seen that a pivoting of the lever 84 will alter the degree of working on the tube $T_2$. More specifically, as the tube working roller 102 of the tube working roller set 79 is moved toward or away from the longitudinal axis of the tube $T_2$, as well as toward and away from the roller 86 in the tube working roller set 81, the tube $T_2$ will be worked sufficiently in an effort to straighten same. Similarly, and since the tube working rollers in the tube working roller set 79 are identical in construction to the rollers in the tube working roller set 81 and the tube straightening roller set 82, the tube $T_2$ will be sufficiently worked so that by the time it reaches the two tube sizing rollers 106 and 107, the tube will be effectively straightened in a first plane thereof.

The two tube sizing rollers 106 and 107 served to return the peripheral surface of the tube $T_2$ to a cylindrical format prior to a movement of the tube $T_2$ onto the next section 72A of the tube straightening mechanism 70. The sizing roller 107 is mounted on a lever 108 that is pivotally secured to the plate 73 by an axle 109 and has an adjustment mechanism 111 identical in nature to the adjustment mechanism for effecting a pivoting of the lever 84 as depicted in FIG. 4.

Each of the two tube working roller sets 79 and 81 as well as the tube straightening roller set 82 is releasably mounted on the plate 73. In order to accommodate this releasable connection to the plate 73, the shaft 88 includes an annular groove 112 therein. The locking bar 76 includes a flat edge 113 which is received in the annular groove 112 in a first position of the locking bar 76 so as to prevent withdrawal of the shaft 88 as well as the shaft 83 from the respective holes 78 and 77. However, upon a moving of the locking bar 76 to the right in FIG. 6 until an arcuate notch 114 becomes concentric with the radius for the outer surface of the shaft 88, the shaft 88 will be permitted to exit from the hole 78 accompanied by a withdrawal of the shaft 83 from the hole 77. As a result of this releasable connection feature, a similar set of rollers with different diameter grooves 116 therein can be used for working different diameter tube emanating from the tube supply.

The aforesaid similar sets of rollers will all usually be preadjusted, due to them having been used previously, so that little or no additional adjustment is required in the form of an additional set-up procedure. Thus, the operation of the system S will be down for only a relatively short interval of time during the change over while the similar sets of rollers is substituted for each of the previously used sets.

As stated above, the subsections 71B, 72A and 72B each comprise sets of rollers identical to those that have been described above with respect to subsection 71A. Thus, further discussion about the orientation of the rollers on the respective plates 73 and 117 is believed unnecessary. On the plate 117, however, there is provided two locking bars 118 and 119 comparable to the locking bar 76 on the plate 73. Since the subsections 72A and 72B are horizontally spaced from one another, as opposed to back-to-back as is the case with the subsections 71A and 71B, two locking bars 118 and 119 are needed in order to releasably lock the sets of working rollers and straightening rollers to the plate 117.

Generally, as the tubes $T_1$ and $T_2$ exit the two sets of sizing rollers 106A, 107A and 106B, 107B at the left end of the subsections 72A and 72B, the tubes $T_1$ and $T_2$ will be sized (i.e., cylindrical) and straight prior to their entry into association with the immediately adjacent tube driving mechanism 10. As a result, the length of tube $T_1$ and $T_2$ entering the associated groove in the selected belts 44 and 63 will remain in the selected groove due to the prior straightening of the respective tube. In other words, there will be no tendency for the length of tubes $T_1$ and $T_2$ to wander left and right as the tube travels between the opposing surfaces of the belt pairs 43, 44 and 62, 63.

If a different size tube is provided by the tube supply, the tube driving mechanism can be shifted left and right (FIG. 3) by turning the hand crank 21 about the axis of rotation 22 therefor to bring an appropriate groove 51–53 as well as 66–68 into proper alignment with the longitudinal axis for the respective tube to facilitate a driving of that tube therethrough.

As the tube exits the tube driving mechanism 10, it enters and passes through a tube cutter device, such as the device disclosed in U.S. Pat. No. 3,568,488. According to this patent, and during a dwell time in an intermittent drive cycle provided by the drive motors 26 and 28, each tube is tightly gripped and placed under tension, and while the tube is tensioned, a cutting tool makes an annular cut in the periphery of the tube which penetrates into the wall of the tube. With the tension applied to the tube, the tensile strength of the tube wall not yet severed is exceeded, and the tube breaks. Consequently, the tube material is not cut entirely through, but partially cut and partially pulled apart at the cutting point. Therefore, the inwardly extending bur is minimized by the extruding caused by the pulling apart action. The subject matter of the aforesaid patent is to be incorporated herein by reference.

Figure 7:
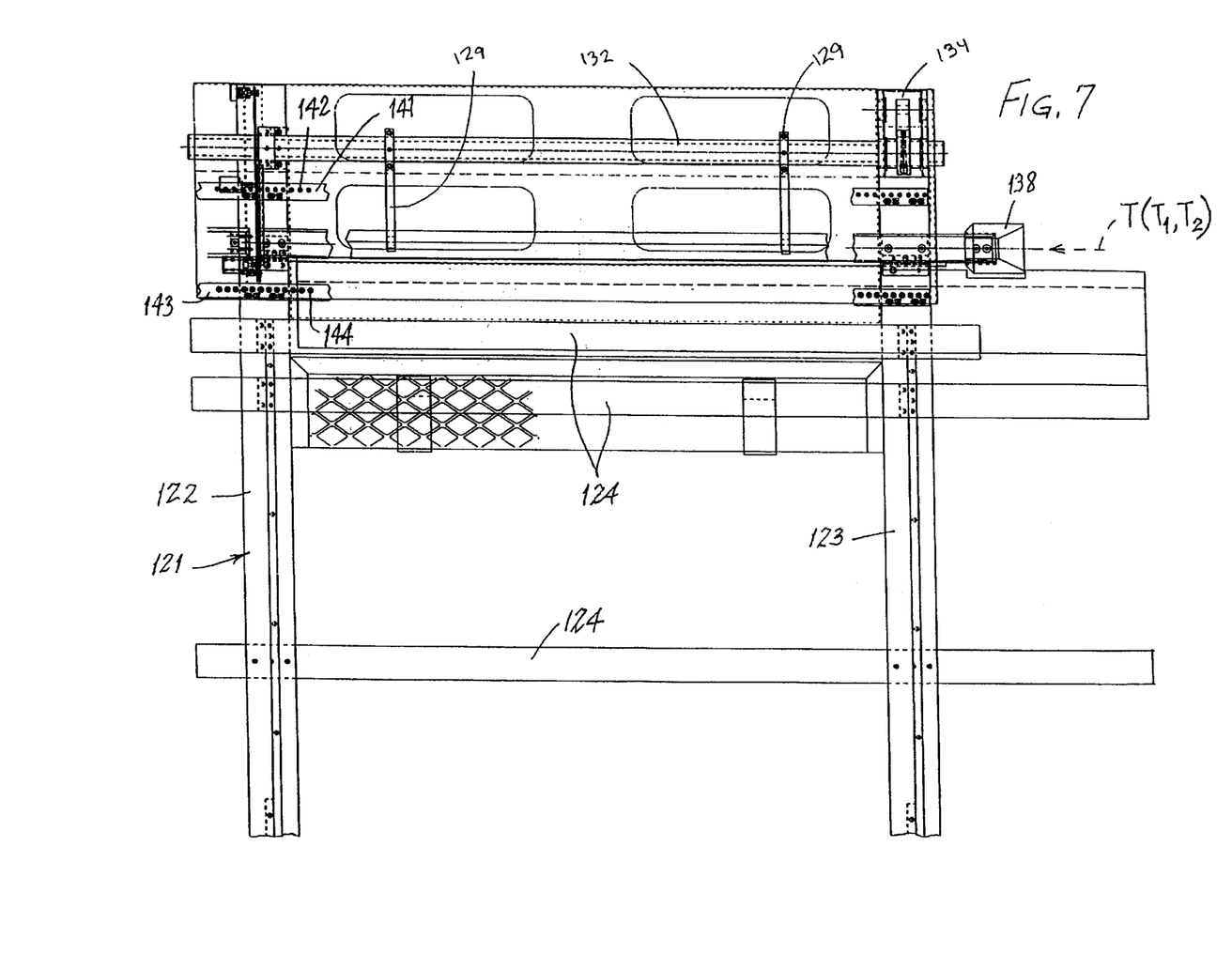
FIG. 7 is a front view of a tube length control device.
Figure 8:
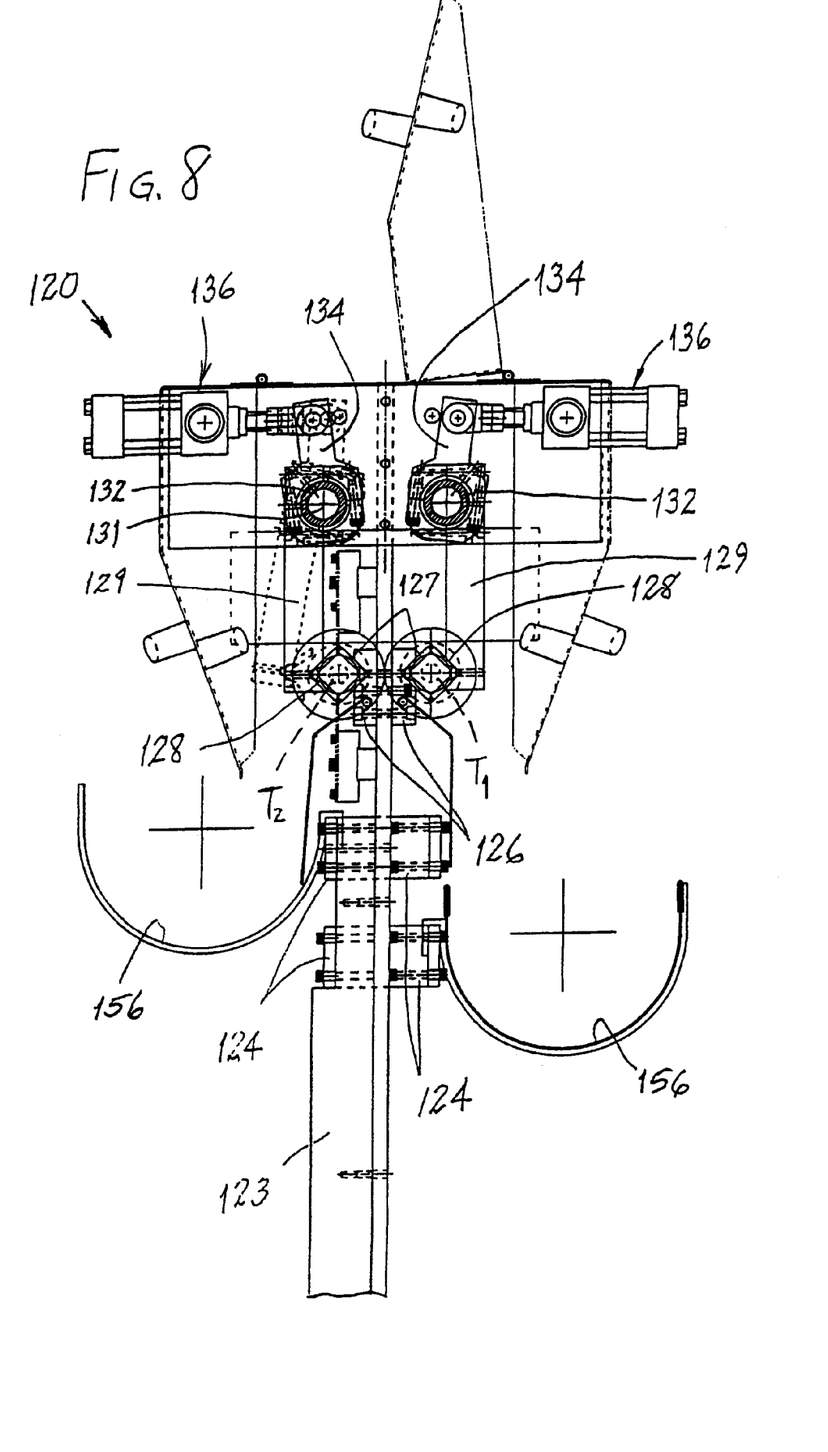
FIG. 8 is a right end view of FIG. 7.
Figure 9:
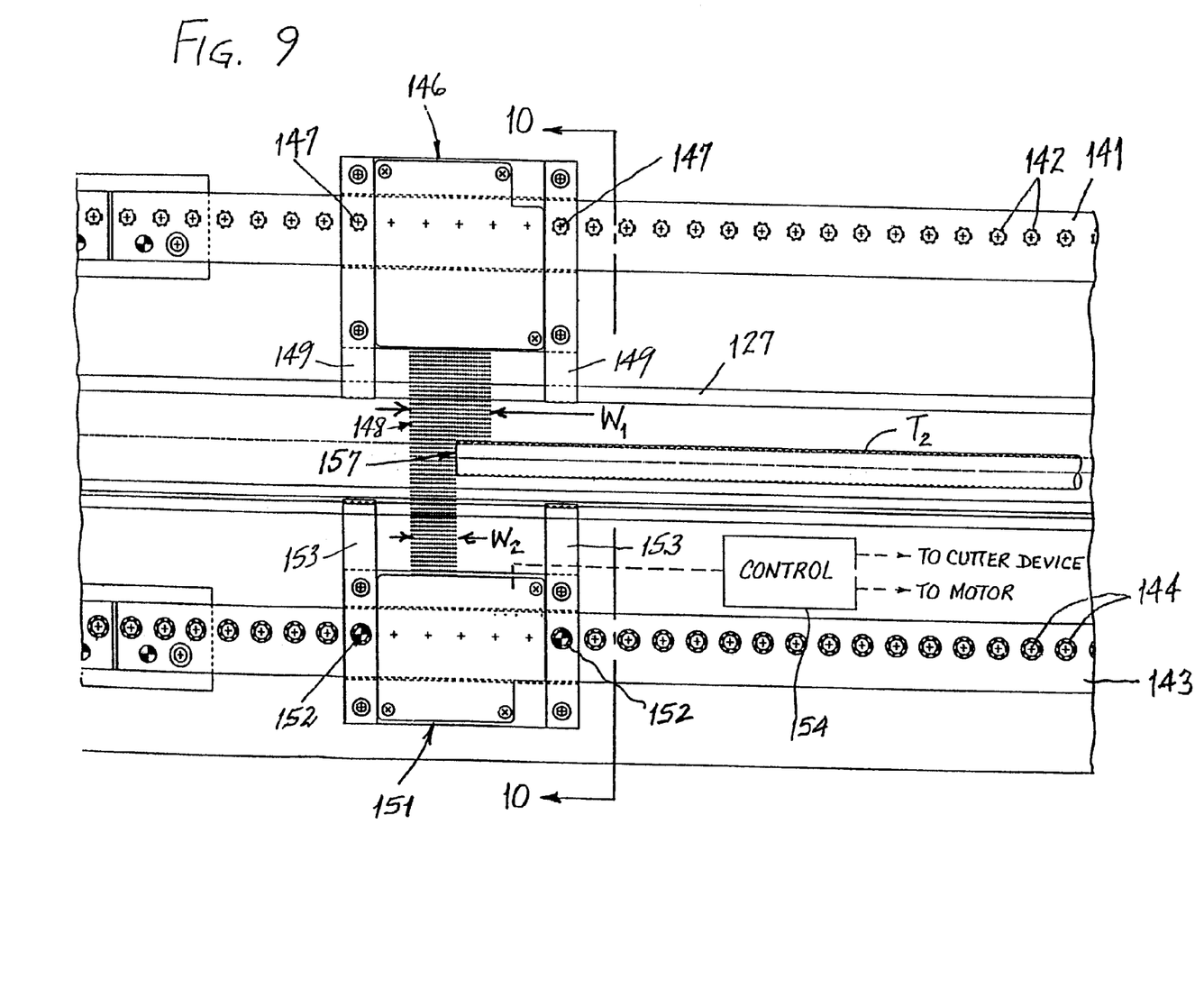
FIG. 9 is an enlarged fragment of FIG. 7 with a portion of the structure being removed so as to render visible the tube present therein.
Figure 10:
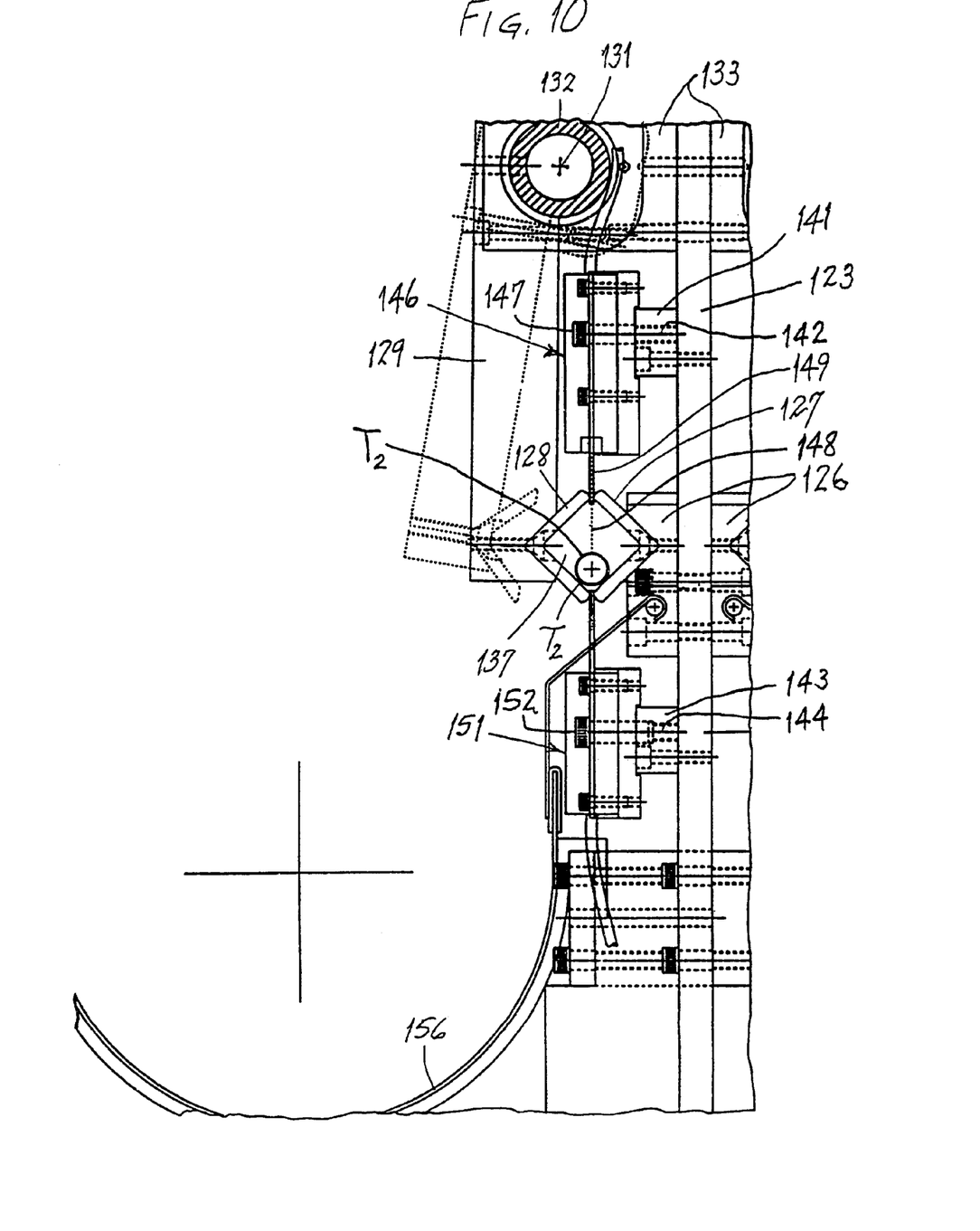
FIG. 10 is a sectional view taken along the line 10—10 of FIG. 9.

As the drive motors 26 and 28 continue to intermittently drive the belts, tubing is pulled through the tube straightening mechanism 70 and delivered to and through the tube cutter device into a tube length control mechanism 120, an example of which is illustrated in FIGS. 7–10. As is illustrated in FIGS. 7 and 8, the tube length control mechanism includes a frame 121 having a pair of vertically upstanding legs 122 and 123 interconnected by horizontally extending bracing 124 oriented on opposite sides of the legs 123 adjacent the upper ends thereof. Further horizontal bracing components 126 are fastened to opposite sides of the upstanding legs 122 and 123 and each have affixed thereto an elongate angled profile, here a V-shaped profile, 127 wherein the legs of the angled profile open outwardly in opposite horizontal directions. A cross section of the elongate strip of angled profile 127 is better illustrated in FIG. 10. A mating elongate strip of angled profile 128 is provided for each profile 127, with each profile 128 being fixedly secured to a lever arm 129 pivotally supported for movement about an axis 131 of an axle 132 secured to a horizontal bracing component 133. The legs of each of the V profiles 128 open outwardly in a direction directly opposing the legs of the V profiles 127. A clevis 134 is provided which is attached to and extends away from a side of the axles 132 remote from the angled profiles 128 and each is acted upon by an actuator 136 for effecting a pivotal movement of the levers 129 between the broken line position and the solid line position illustrated in both of FIGS. 8 and 10. When the lever arms 129 are in the solid line position illustrated in FIG. 10, the angled profiles 127 and 128 mate to define a rectangular opening 137 adapted to receive therein a tube, namely, a tube $T_2$ as illustrated in FIG. 10. The tube $T_1$ is received into an identical array on the right hand side of the upstanding legs 123 as depicted in FIG. 8. Each of the tubes $T_1$ and $T_2$ are guided into a corresponding opening 137 between the angled profiles 127 and 128 by a funnel mechanism 138 (FIG. 7).

An elongate horizontal bar 141 is secured to the upstanding legs 122 and 123 and has a plurality of horizontally extending holes 142 horizontally spaced therealong. In this particular embodiment, each of the holes is precisely one-half inch from the next adjacent hole. The elongate bar 141 is oriented above the angled profiles 127 and 128 as best depicted in FIGS. 7 and 10. A similar elongate horizontally extending bar 143 is secured to and extends between the upstanding legs 122 and 123 and is oriented below the angled profiles 127 and 128. The bar 143 also has a plurality of horizontally extending holes 144 therein, each hole 144 being precisely spaced one-half inch from the next adjacent hole and oriented directly beneath a hole 142.

A light sending unit 146 is mounted to the elongate bar 141 using a selected hole or holes 142 in the elongate bar 141 for effecting an appropriate positioning thereof measured from the location of the cutter blade in the tube cutter device schematically shown at 150 in FIG. 1. Screws 147 are used to secure the light sending unit 146 to the elongate bar 141. The light sending unit 146 is configured to send a light beam 148 of substantial width $W_1$ (FIG. 9) constituting a multiple of the half-inch spacing between the holes 141 and 144.

The light sending unit 146 has a pair of spacer tabs 149 extending into the path of movement of the elongate angled profiles 127 and 128 so as to prevent distal edges of the legs of the angled profiles 127 and 128 from touching one another at a location therebetween so as to permit the full width $W_1$ of the light beam 148 to enter the open space 137 between the angled profiles 127 and 128 as schematically depicted in FIG. 10.

A light detecting unit 151 is mounted to the bar 143 and is secured thereto by a plurality of screws 152 received in holes 144 oriented directly beneath the holes 142 into which are received the aforesaid screws 147. As a result, the light detecting unit 151 is oriented directly below the light sending unit 146 as illustrated in FIG. 9. The light detecting unit 151 has a pair of spaced spacer tabs 153 extending into the path of movement of the elongate angled profiles 127 and 128 so as to prevent the distal edges of the legs of the angled profiles 127 and 128 from contacting one another between the spacer tabs 153. As a result, a full width $W_1$ of the light beam 148 emanating from the light sending unit 146 will be fully detected by the light detecting unit 151 through the gap created by the spacer tabs 149 and 153.

As a respective tube $T_1$ or $T_2$ enters the open space 137 between the angled profiles 127 and 128 on opposite sides of the upstanding legs 123, the leading end 157 (FIG. 9) of the tube will enter the region whereat the light beam 148 is located. The drive motors 26 or 28 will be preprogrammed to stop at this time. A portion of the leading end 157 of each tube, here the tube $T_2$ (FIG. 9), will intersect the width $W_1$ of the light beam 148 and the light detecting unit 151 will detect a reduced width $W_2$ of light in the light beam 148 and a control 154 will generate a signal to the controlling reversible motor 26 or 28 to either an advance of the respective tubes $T_1$ and $T_2$ leftwardly or rightwardly (FIG. 9) to locate the leading ends 157 of the tubes $T_1$ and $T_2$ precisely at the preselected locations from the cutter blades 150. When the control 154 has so noted from the light detecting units 151 that the leading ends 157 of the tubes $T_1$ and $T_2$ have been appropriately located, only then will a signal be sent by the control 154 to the tube cutter device to cause the cutter blades 150 to cut the tubes $T_1$ and $T_2$ thereat. Following a completion of a cutting operation, the control 154 will activate the actuators 136 to cause the lever arms 129 and associated profiles 128 to pivot to the broken line position thereby enabling the tubes $T_1$ and $T_2$ to fall under the effect of gravity into a respective trough 156.

The light sending unit 146, the light detecting unit 151 and the control 154 therefor are conventional devices available from KEYENCE CORP. OF AMERICA, particularly, model number LX2-13(w).

Operation

Although the operation of the mechanism described above will be understood from the foregoing description by skilled persons, a summary of such description is now given for convenience.

Tubing T is drawn from the tube supply through two sections 71 and 72 of a tube straightening mechanism 70 by a belt drive tube driving mechanism 10. The tube drive mechanism 10 is adjustably movable laterally by rotating the hand crank 21 so that an appropriately sized one of the grooves 51–53 and 66–68 in the lower one of the pairs of belts will align with the longitudinal axis of the now straightened tube $T_1$ and $T_2$ exiting the tube straightening mechanism 70. The tube pulled from the tube supply through the tube straightening mechanism 70 is thence delivered to and through the tube cutter device to a tube length control mechanism 120 which senses the length of tube between the cutter blades 150 in the tube cutter device and the leading end 157 of the tubes and once the leading ends of the tubes are appropriately located by appropriate control of the intermittent operation of the motors 26 and 28, a signal is sent from the control 154 in the tube length control mechanism 120 to the tube cutter device to effect a cutting of one tube or two tubes by the cutter blades 150, which tube or tubes are thereafter permitted to drop into a trough 156.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A thin wall continuous tube driving apparatus, comprising:

a frame;

a carriage reciprocally movably mounted on said frame between at least first and second positions;

at least first and second opposing pairs of endless conveyor belts, each pair having opposing first and second endless conveyor belts and separate drive motors therefor mounted on said carriage and movable therewith in a direction transverse of a longitudinal direction of each said opposing pairs of endless conveyor belts;

at least two side-by-side endless grooves in at least one of said first and second endless conveyor belts, a surface of each endless groove being configured to oppose a surface on the other of said first and second endless conveyor belts to define at least two sets of openings, a tube from a tube source being received in a selected one of said openings, said surfaces on each of said first and second endless conveyor belts belts being configured to frictionally engage the tube from opposite sides thereof; and drive means for reciprocating said carriage to orient a selected one of said openings in axial alignment with an axis of the tube from the tube source.

2. An apparatus according to claim 1, wherein each of said sets of openings are of a differing size so as to accommodate tubing of a corresponding differing size from said tube source.

* * * * *